(12) United States Patent
Kim et al.

(10) Patent No.: US 9,547,390 B2
(45) Date of Patent: Jan. 17, 2017

(54) TOUCH SCREEN DISPLAY DEVICE WITH IN-SET SIGNAL CONTROLLER

(71) Applicant: LG DISPLAY CO., LTD., Seoul (KR)

(72) Inventors: Sung Chul Kim, Goyang-si (KR); Sung Yub Lee, Busan (KR); Seung Eun Pyo, Incheon (KR)

(73) Assignee: LG Display Co., Ltd., Seoul (KR)

( * ) Notice: Subject to any disclaimer, the term of this patent is extended or adjusted under 35 U.S.C. 154(b) by 105 days.

(21) Appl. No.: 14/144,166

(22) Filed: Dec. 30, 2013

(65) Prior Publication Data

US 2014/0320446 A1    Oct. 30, 2014

(30) Foreign Application Priority Data

Apr. 30, 2013 (KR) .................. 10-2013-0047957

(51) Int. Cl.
*G09G 3/36* (2006.01)
*G06F 1/16* (2006.01)
(Continued)

(52) U.S. Cl.
CPC ............. *G06F 3/0416* (2013.01); *G06F 3/044* (2013.01); *G06F 3/0412* (2013.01);
(Continued)

(58) Field of Classification Search
CPC ............... G06F 3/03547; G06F 3/041–3/0416; G06F 3/0488–3/04897; G06F 2200/1634; G06F 2203/0339; G06F 2203/04104–2203/04112; G06F 1/1643; G06F 1/169–1/1692
See application file for complete search history.

(56) References Cited

U.S. PATENT DOCUMENTS

| 2006/0081850 | A1* | 4/2006 | Lee et al. ............. | H01L 29/04 257/72 |
| 2008/0191987 | A1* | 8/2008 | Lee ..................... | G09G 3/3614 345/92 |

(Continued)

FOREIGN PATENT DOCUMENTS

| CN | 101393500 A | 3/2009 |
| CN | 102375639 A | 3/2012 |

(Continued)

OTHER PUBLICATIONS

United States Office Action, U.S. Appl. No. 14/850,651, Feb. 12, 2016, 17 pages.

(Continued)

*Primary Examiner* — Sanghyuk Park
(74) *Attorney, Agent, or Firm* — Fenwick & West LLP

(57) ABSTRACT

A touch screen display device is discussed. The device uses common electrodes, which are formed for display images, as touch electrodes. In a display interval, the common electrodes receive a common voltage and allow images to be displayed. In a touch sensing interval corresponding to a non-display interval of a single frame of plural frames, the common electrodes are driven as the touch electrodes and allow a touch position to be sensed. When the touch sensing interval is terminated, the data voltages which had been applied to the data lines before the touch sensing interval are re-applied to the data lines. As such, when a succeeding display interval starts after the touch sensing interval, the reduction of charging voltage in a pixel can be prevented or reduced. Therefore, a picture fault or an image fault can be prevented.

13 Claims, 6 Drawing Sheets

(51) Int. Cl.
  *G06F 3/041* (2006.01)
  *G06F 3/044* (2006.01)
(52) U.S. Cl.
  CPC ......... *G09G 3/3614* (2013.01); *G09G 3/3655* (2013.01); *G09G 3/3688* (2013.01); *G09G 3/3696* (2013.01); *G06F 2203/04103* (2013.01); *G09G 2310/0248* (2013.01)

(56) References Cited

U.S. PATENT DOCUMENTS

| | | |
|---|---|---|
| 2010/0315403 A1 | 12/2010 | Kaneyoshi et al. |
| 2011/0210927 A1 | 9/2011 | Mizuhashi et al. |
| 2012/0044171 A1 | 2/2012 | Lee et al. |
| 2012/0050217 A1* | 3/2012 | Noguchi ............... G06F 3/0412 345/174 |
| 2013/0127752 A1 | 5/2013 | Takeuchi et al. |

FOREIGN PATENT DOCUMENTS

| | | |
|---|---|---|
| CN | 102445780 A | 5/2012 |
| KR | 10-2012-0019371 A | 3/2012 |
| TW | 495628 B | 7/2002 |
| TW | 200401243 A | 1/2004 |
| TW | 200521933 A | 7/2005 |
| TW | 200606503 A | 2/2006 |
| TW | I 322292 A | 3/2010 |

OTHER PUBLICATIONS

Korean First Office Action, Korean Application No. 10-2013-0047957, Apr. 5, 2016, 5 pages (with concise explanation of relevance).

Taiwan Intellectual Property Office, Office Action, Taiwanese Patent Application No. 102147497, Aug. 13, 2015, six pages.

Chinese Office Action, Chinese Application No. 201310713429.0, Aug. 25, 2016, 12 pages (with concise explanation of relevance).

* cited by examiner

TOUCH SCREEN DISPLAY DEVICE WITH IN-SET SIGNAL CONTROLLER

The present application claims priority under 35 U.S.C. §119(a) of Korean Patent Application No. 10-2013-0047957 filed on Apr. 30, 2013, which is hereby incorporated by reference in its entirety.

BACKGROUND

Field of the Disclosure

The present application relates to a touch screen display device.

Description of the Related Art

With development of various portable electrical appliances such as mobile communication terminals, notebook computers and so on, demands for display devices being applied to the portable electric appliance are being increased. Liquid crystal display (LCD) devices among the display devices gradually widen application fields because of their features of easy mass production, easy driving means and realization of high image quality and large size.

In general, the LCD device includes lower and upper substrates which are combined with each other in such a manner as to face each other with having a liquid crystal layer therebetween. The LCD device controls transmittance of light penetrating the liquid crystal layer of each pixel according to a data voltage, in order to display an image corresponding to an image signal.

Recently, the LCD devices are being manufactured in such a manner as to provide functions of well-known input devices such as a mouse, a keyboard and so on. To this end, a touch screen allowing a user to direct input through it using one of a finger and a pen is being applied to the LCD device.

The touch screen is being applied to monitors of navigation systems, industrial terminals, notebook computers, financial automation equipment, game consoles and so on. Also, the touch screen is being applied to potable terminal such as mobile phones, MP3s, PDAs, PMPs, PSPs, mobile game devices, DMB receivers and so on. Moreover, the touch screen is being applied to home appliances such as refrigerators, microwave ranges, washing machines and so on. In this manner, the application field of the touch screen with an easy manipulation property is being widened.

For slimness of the LCD device with the touch screen, an LCD device including a liquid crystal panel with a built-in touch screen is being developed. Also, touch sensors being built into the display device such as an LCD device or an organic light emitting display device are being developed in an in-cell type. The in-cell type touch sensors include a photo touch sensor and a capacitive touch sensor. The photo touch sensor can recognize a touch on the basis of intensity of light sensed by a photo transistor. The capacitive touch sensor can recognize a touch based on a variation of the capacitance. More specifically, the photo touch sensor senses a loss current of the photo transistor, which varies along the quantity of light being intercepted or reflected by a touch object, and recognizes a touch. The capacitive touch sensor recognizes a touch by sensing a variation of the capacitance which is generated by the movement of electric charges toward a touch point when a conductive material such as a part of a human body or a stylus pen touches it.

FIGS. 1 and 2 are views schematically showing a touch screen LCD device of the related art.

As shown in FIG. 1, the related art LCD device with a built-in touch screen includes lower and upper substrates 10 and 20 which are combined with having a liquid crystal layer (not shown) therebetween. The LCD device adjusts transmittance of light penetrating the liquid crystal layer of each pixel according to a data voltage, in order to display an image corresponding to an image signal. Also, the LCD device detects a touch position TS using the variation of a capacitance Ctc in accordance with a touch TS of a user.

The upper substrate 20 is configured to include a black matrix 30, color filters 40 and an overcoat layer 50. The black matrix 30 defines pixel regions opposite to a plurality of pixels. The color filters 40 include red, green and blue color filters which are formed on the pixel regions defined by the black matrix 30. The overcoat layer 50 is formed in such a manner as to cover the black matrix 30 and the red, green and blue color filters 40. Also, the overcoat layer 50 is used to planarize the surface of the upper substrate 20.

The lower substrate 10 is configured to include the plurality of pixels which are used to drive the liquid crystal layer and detect a touch TS of a finger of a user or the touch TS of a pen. The plurality of pixels is defined by data and gate lines DL and GL crossing each other. Each of the pixels includes a common electrode 60 receiving a common voltage and a pixel electrode used to apply the data voltage to a region of the liquid crystal layer (or a cell Clc). The common electrode 60 and the pixel electrode are formed from a transparent conductive material such as indium-tin-oxide ITO. Such a pixel forms an electrical field in accordance with the data voltage and drives the region of the liquid crystal layer (or the cell Clc). To this end, the data voltage is transferred from the respective data line DL to the pixel electrode by means of a thin film transistor TFT which is switched according to a gate signal on the respective gate line GLn.

Meanwhile, in a non-display interval when any image is not displayed, the LCD device detects a touch of the finger of the user or a touch of the pen by driving the common electrode 60 as a sensing/driving electrode for detecting the touch. More specifically, a touch capacitance in accordance with a touch is generated between the upper substrate 20 and the common electrode which are positioned over each pixel. A touch controller (not shown) of the LCD device detects a touch position by comparing the touch capacitance Ctc, which is generated by the touch, with a reference capacitance. Also, the touch controller outputs the detected touch position to the exterior.

In order to easily recognize the coordinates of a touch, the common electrode 60 used in the touch screen LCD device as a touch electrode can be divided into n horizontal common electrodes and m vertical common electrodes. The divided common electrodes 60 must be connected to one another in a display interval, but separated from one another in a touch recognition interval. The connection and separation of the divided common electrodes 60 can be performed by a common voltage multiplexer (not shown) on a printed circuit board which is disposed outside the panel. As such, the divided common electrodes within the panel are arranged in such a manner as to be separate from one another.

FIG. 3 is a timing chart illustrating problems of the touch screen LCD device according to the related art.

In order to enhance a touch report rate, the touch screen LCD device of the related art allows a display operation and a touch sensing operation to be divisionally performed by gate lines. The touch report rate is in inverse proportion to a total sensing time which is necessary to scan all sensing nodes within a touch screen. As such, the touch report rate decreases as the total sensing time lengthens. Also, the touch report rate means the number of touch coordinate values which are transferred during a single second.

The gate line division driving method can generate a line dim phenomenon in a boundary line between a touch sensing area and a display area (i.e., in a gate line which is scanned at a transition time point from the touch sensing operation into the display operation).

More specifically, in the display interval T1, a data voltage on a kth data line DLk is transferred to a pixel through a transistor, which is turned-on by a gate signal on a mth gate line GLm, and displayed on the screen, Also, another data voltage on the kth data line DLk is transferred to another pixel through another transistor, which is turned-on by another gate signal on a (m+1)th gate line GLm+1, and displayed on the screen. Sequentially, in the touch sensing interval T2, a ground voltage GND is applied to the data lines DL including the kth data line DLk. As such, a touch of a user can be detected thought the divided common electrodes. After the touch sensing interval T2, i.e., when the touch sensing interval T2 lapses, still another data voltage on the kth data line DLk is transferred to still another pixel through still another transistor, which is turned-on by still another gate signal on a (m+2)th gate line GLm+2, displayed on the screen. At this time, the voltage on the kth data line DLk must increase from the ground voltage GND to the still another data voltage, and a voltage difference between still another data voltage and the ground voltage GND must be large. As such, the data voltage charged into still another pixel must decrease. Due to this, an image fault such as a line dim is generated.

BRIEF SUMMARY

Accordingly, embodiments of the present application are directed to a touch screen display device that substantially obviates one or more of problems due to the limitations and disadvantages of the related art.

The embodiments relate to provide a touch screen display device which is adapted to prevent a line dim phenomenon.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a touch screen display device includes: a display panel configured to include a plurality of pixels and a plurality of common electrodes; a gate driver configured to group a plurality of gate lines on the display panel into at least two blocks and sequentially drive the grouped blocks in a primary time interval; a data driver configured to drive a plurality of data lines on the display panel every primary time interval; a common voltage generator configured to apply a common voltage to the common electrodes every primary time interval; a touch controller configured to detect a touch position on the display panel using a capacitance being induced in the common electrodes every secondary time interval from a time point after a respective block is driven to another time point before a succeeding block is driven; and an in-set signal controller configured to store data signals opposite to the pixels on the last gate line within the respective block as in-set signals whenever the respective block is driven, and supply the stored in-set signals with the data lines before the succeeding block is driven.

The touch screen display device according to one general aspect of the present embodiment enables the gate driver re-drives the last gate line within the respective block whenever the stored in-set signals are applied to the data lines.

The touch screen display device according to one general aspect of the present embodiment further includes a timing controller configured to control the gate driver, the data driver, the common voltage generator, the touch controller and the in-set signal controller in operational timing.

The touch screen display device according to one general aspect of the present embodiment allows the in-set signal controller to include a memory for storing the in-set signals.

In the touch screen display device according to one general aspect of the present embodiment, the timing controller applies a reset signal for resetting the in-set signals, which are opposite to the respective block and stored in the memory, when the succeeding block is driven.

The touch screen display device according to one general aspect of the present embodiment enables the common voltage generator to apply a ground voltage to the data lines every secondary time interval.

A method of driving a touch screen display device according to another aspect of the present embodiment includes: sequentially driving at least two blocks, into which a plurality of gate lines on a display panel are grouped, in a primary time interval using a gate driver; repeatedly applying data signals to a plurality of data lines on the display panel every primary time interval using a data driver; storing the data signals opposite to pixels on the last gate line within a respective block as in-set signals every primary time interval; sensing a touch position on the display panel every secondary time interval between the primary time intervals; and supplying the data lines with the stored in-set signals every tertiary time interval between a preceding secondary time interval and a succeeding primary time interval.

The method according to another aspect of the present embodiment further includes re-driving the last gate line within the respective block using the gate driver whenever the stored in-set signals are applied to the data lines.

In the method according to another aspect of the present embodiment, the at least two blocks are sequentially driven during a single frame.

In the method according to another aspect of the present embodiment, the display panel is driven in a column inversion mode allowing the data signals to be inverted alternately with one another according to the data lines.

The method according to another aspect of the present embodiment further includes resetting a memory, in which the in-set signals opposite to one of the respective block are stored, when the succeeding block is driven.

The method according to another aspect of the present embodiment further includes applying a ground voltage to the data lines using the common voltage generator every second time interval.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
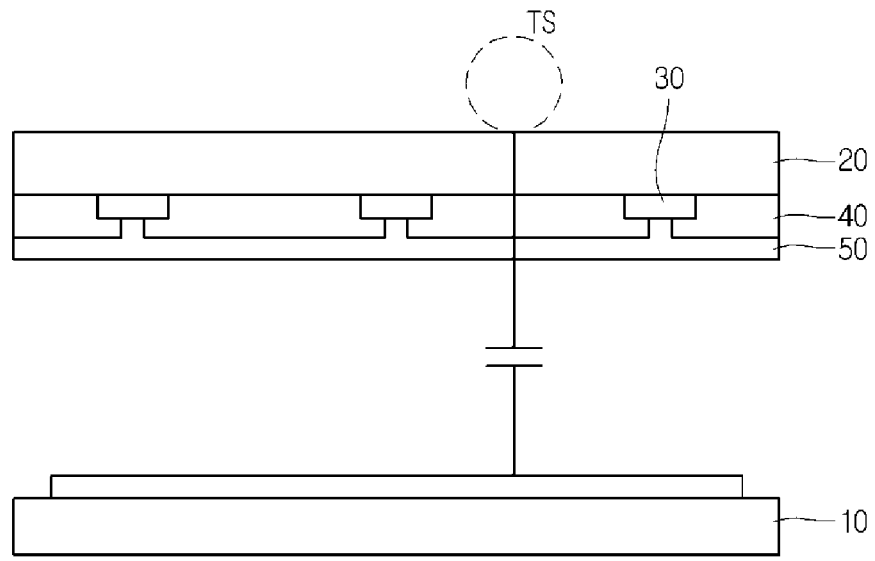
FIG. 1 is a cross-sectional view showing a touch screen panel of related art.
Figure 2:
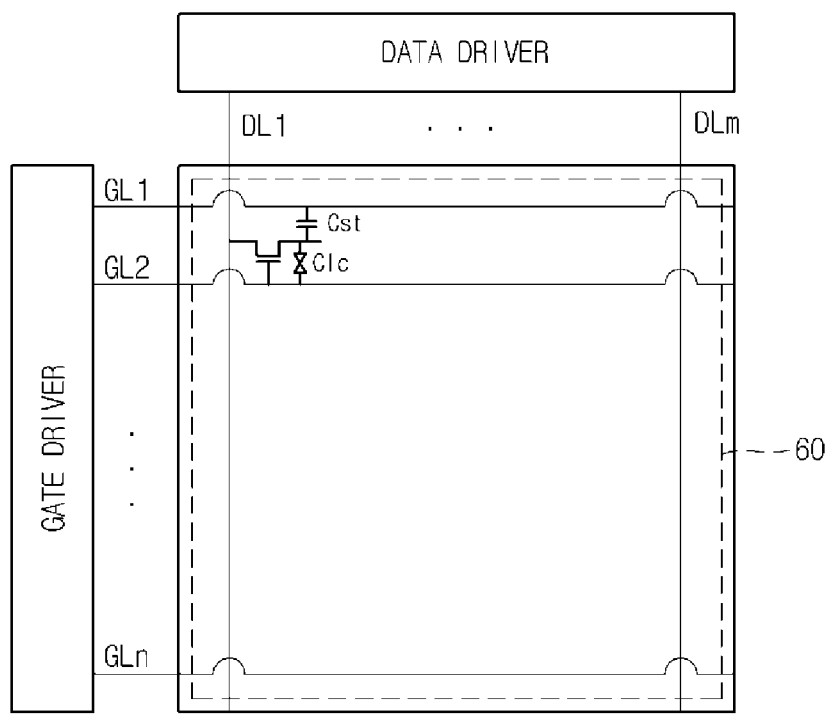
FIG. 2 is a planar view showing a touch screen panel of the related art.
Figure 3:
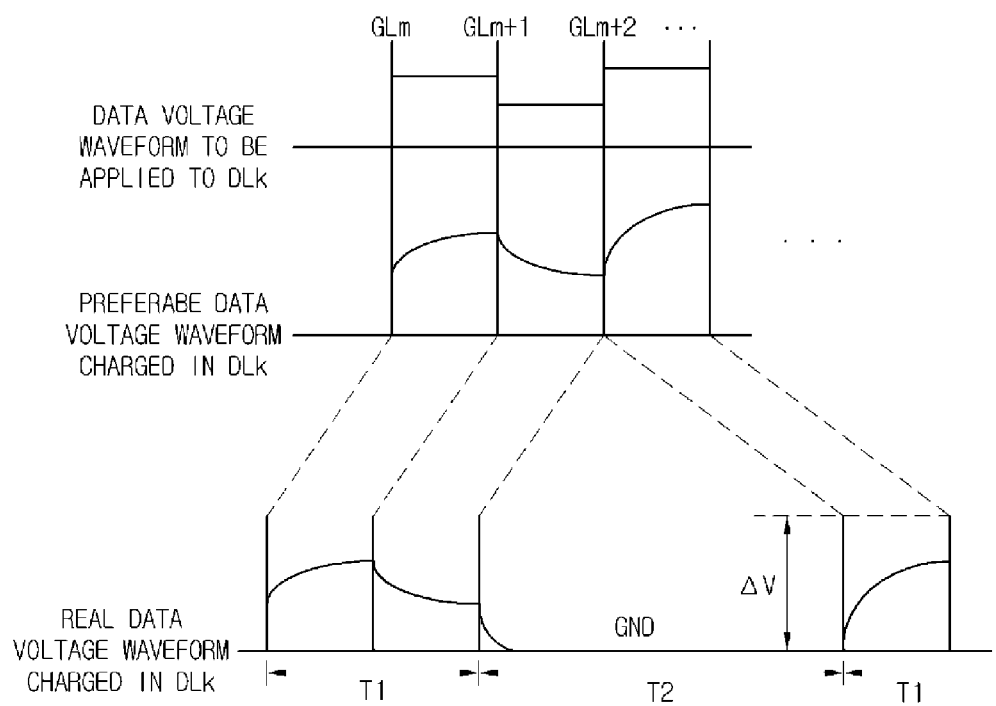
FIG. 3 is a waveform diagram illustrating the operation of a touch screen LCD device according to the related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

A touch screen display device and a driving method thereof according to embodiments of the present disclosure will now be described in detail. An LCD device corresponding to one of display devices is classified into a TN (twisted nematic) mode, a VA (vertical alignment) mode, an IPS (in-plane switching) mode, a FFS (fringe field switching) mode and so on according to the liquid crystal molecular alignment states. The LCD devices of the IPS and FFS modes corresponding to a horizontal electric field system allow a pixel electrode ITO and a common electrode Vcom to be arranged on a lower substrate, and control the liquid crystal molecular alignment using an electric field which is formed between the pixel electrode and the common electrode. The touch screen display device and the driving method thereof according to embodiments of the present disclosure can be applied to the LCD devices of the IPS and FFS modes which each include the pixel and common electrodes formed on the lower substrate. However, the present disclosure is not limited to this. In other words, the touch screen display device and the driving method thereof according to embodiments of the present disclosure can be applied to the LCD devices of the TN and VA modes which each include a pixel electrode formed on the lower substrate and a common electrode formed on an upper substrate. In still another manner, the touch screen display device and the driving method thereof according to embodiments of the present disclosure can be applied to an organic light emitting display device.

Figure 4:
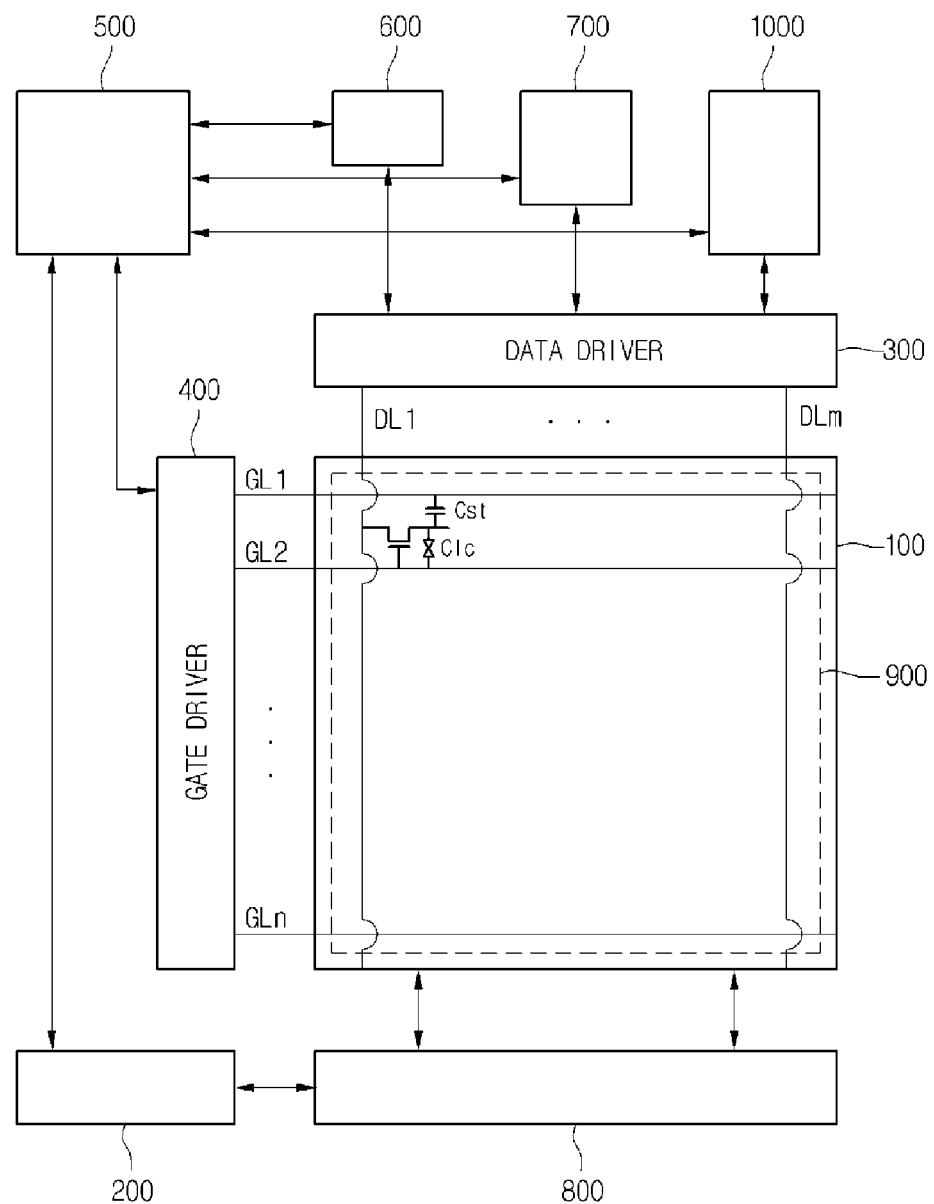
FIG. 4 is a block diagram showing a touch screen display device according to an embodiment of the present disclosure.

FIG. 4 is a block diagram showing a touch screen display device according to an embodiment of the present disclosure.

Referring to FIG. 4, the touch screen display device according to an embodiment of the present disclosure can include a display panel 100 with an in-cell type touch screen for detecting a touch position of a user, a backlight unit 800 and a drive circuit portion 200, 300, 400, 500, 600, 700 and 1000. If the touch screen display device is applied to an organic light emitting display device with a self-luminous property, the backlight unit 200 can be removed.

The display panel 100 includes a plurality of pixels including a single pixel which is shown in the drawing. The drive circuit portion can include a backlight driver 200, a data driver 300, a gate driver 400, a timing controller 500, a touch controller 600, an in-set signal controller 700 and a common voltage generator 1000. The touch controller 600 can detect a touch position on the display panel 100 using capacitances which are induced to common electrodes. Also, the touch controller 600 can apply a common voltage to the common electrodes. In this case, the common voltage generator 1000 can be removed. Alternatively, if the touch controller 600 performs only the touch position detection, the common voltage generator 1000 applying the common voltage to the common electrodes is included in the touch screen display device as shown in the drawing.

Also, at least a part of the drive circuit portion can be formed in one of COG (chip on glass) and COF (chip on flexible printed circuit or chip on film) system.

The display panel 100 includes upper and lower substrates which are combined with having a liquid crystal layer (not shown) therebetween. Also, the plurality of pixels on the display panel 100 can be arranged in a matrix shape.

Such a display panel 100 adjusts transmittance of light penetrating through the liquid crystal layer (or a liquid crystal cell), opposite to each pixel, using an electric field formed by each pixel, in order to display an image corresponding to an input image signal. Moreover, the display panel 100 uses the common electrode 900 not only to control the liquid crystal molecular alignment of the liquid crystal layer, but also as a touch electrode for sensing a touch.

A color filter layer can be formed on the upper substrate. The color filter layer can includes red, green and blue color filters.

A pixel array can be formed on the lower substrate. The pixel array can be used to not only drive the liquid crystal layer but also sense the touch position using capacitance which is varied by the touch of the user.

More specifically, a plurality of gate lines GL1~GLn and a plurality of data lines crossing each other are arranged on the lower substrate in such a manner as to define the plurality of pixels. The plurality of pixels can be grouped by threes. The three pixels included in each pixel group can face the red, green and blue color filter and form a color pixel. In other words, the three pixels opposite to the red, green and blue color filter can be used as red, green and blue sub-pixels which form a single color pixel. Each of the sub-pixels can include a thin film transistor TFT, a storage capacitor Cst, a pixel electrode and a common electrode. The thin film transistor includes a gate electrode, an active layer, an insulation layer and data electrodes (i.e., source/drain electrodes). Such a thin film transistor TFT can be formed in a bottom gate structure which allows the gate electrode to be disposed under the active layer. Alternatively, the thin film transistor can be formed in a top gate structure which allows the gate electrode over the active layer.

The pixel electrode can be electrically connected to the drain electrode of the thin film transistor TFT through a contact member. As such, the pixel electrode can supply a region of the liquid crystal layer (i.e., a liquid crystal cell Clc) with a data voltage (or a pixel voltage) corresponding to an image signal.

The timing controller 500 re-arranges an image signal applied from the exterior and converts the image signal into digital image data of a frame unit. The digital image data is applied from the timing controller 500 to the data driver 300. Also, the timing controller 500 uses a vertical synchronous signal Vsync, a horizontal synchronous signal Hsync and a clock signal CLK, which are applied from the exterior, and generates gate control signals GCS for controlling the gate driver 400 and data control signals DCS for controlling the data driver 300.

The data control signals DCS are applied from the timing controller 500 to the data driver 300. Such data control signals DCS can include a source start pulse SSP, a source sampling clock SSC, a source output enable signal SOE and a polarity signal POL. The gate control signals GCS are applied from the timing controller 500 to the gate driver 400. Such gate control signals GCS can include a gate start pulse GSP, a gate shift clock GSC and a gate output enable signal GOE.

Moreover, the timing controller 500 generates a backlight control signal BCS which is used to control a driving state of the backlight driver 200. The backlight control signal BCS is applied from the timing controller 500 to the backlight driver 200.

Furthermore, the timing controller 500 can derive a mode control signal from the vertical and horizontal synchronous signals Vsync and Hsync and the clock signal CLK. The mode control signal can be used to change the state of the common electrode 900 on the display panel 100. As such, the common electrode 900 can be used to not only adjust the liquid crystal molecular alignment of the liquid crystal layer but also sense a touch of the user. To this end, the mode control signal can be applied from the timing controller 500 to the touch controller 600. Then, the touch controller 600 can perform the above-mentioned operation in response to the mode control signal.

The gate driver 400 generates a scan signal, which is used to selectively drive the thin film transistor TFT within each pixel, using the gate control signals GCS applied from the timing controller 500. The generated scan signal is sequentially applied to the plurality of gate lines GL1~GLn which are formed on the display panel 100. As such, the thin film transistors of the pixels can be driven by the scan signal on the respective gate line GL.

The data driver 300 converts the digital image data R,G,B applied from the timing controller 500 into analog data voltages (or data signals). The converted analog data voltages are transferred from the data driver 300 to the plurality of data lines DL1~DLm, which are formed on the display panel 100, under the control of the data control signals DCS. The display panel 100 cannot emit light in itself. As such, the display panel 100 displays an image (or a picture) using light applied from the backlight unit 800.

The backlight unit 800 is used to irradiate light to the display panel 100. To this end, the backlight unit 800 can include at least one light source configured to emit light and optical members which are used to guide light emitted from the light source toward the display panel 100 and enhance efficiency of light. A cold cathode fluorescent lamp CCFL, an external electrode fluorescent lamp EEFL or light emitting diodes LEDs can be used as the light source. The optical members can include a plurality of optical sheets, a light guide plate, a diffusive sheet and so on.

The backlight driver 200 can reply to the backlight control signal BCS applied from the timing controller 500 and drive the backlight unit 800 in a previously set driving frequency. The driving frequency can be set to one of 100 Hz, 120 Hz, 200 Hz and 240 Hz. In order to clearly display images, the backlight driver 200 can control on/off times, a duty ratio and brightness of the light source. The on/off times, duty ratio and brightness of the light source can depend on the data voltage which is applied to the pixel.

The in-set signal controller 700 can store the data voltages and read-out the stored data voltages. To this end, the in-set signal controller 700 can include a built-in memory (not shown) which is used to store the data voltages. Such an in-set signal controller 700 can receive a reset signal from the timing controller 500. The reset signal is used to not only control the operation of the in-set signal controller 700 but also erase the data voltages stored in the built-in memory.

The timing controller 500 and the data driver 300 can be formed in separated IC (Integrated-circuit) chips from each other. Alternatively, the timing controller 500 and the data driver 300 can be integrated in a single IC chip. Also, the touch controller 600 and the timing controller 500 can be formed in separated IC chips from each other. Alternatively, the touch controller 600 and the timing controller 500 can be integrated in a single IC chip.

The touch controller 600 and the in-set signal controller 700 can be formed separately from the timing controller 500 and the data driver 300. Alternatively, the touch controller 600 and the in-set signal controller 700 can be formed in such a manner as to be included in one of the timing controller 500 and the data driver 300.

The timing controller 500 time-divides each frame period interval into at least one display mode interval and at least one touch sensing mode interval (or into a plurality of display mode intervals and a plurality of touch sensing mode intervals) and enables the display mode DM and the touch sensing mode TM to be performed alternately with each other by at least one. To this end, the timing controller 500 can generate the mode control signal used for switching the display mode DM and the touch sensing mode TM, and control the data driver 300, the gate driver 400, the touch controller 600 and the in-set signal controller 700 using the mode control signal. More specifically, the timing controller 500 controls not only the data driver 300 and the gate driver 400 to be driven in the display mode interval but also the touch controller 600 and the in-set signal controller 700 to be driven in the touch sensing mode interval. Also, the timing controller can divide the display panel 100 into a plurality of blocks and enable the divided blocks to be driven in a time division system. To this end, the timing controller 500 can store a single block of image data into the in-set signal controller 700 in order to output the block image data.

In order to secure a driving time of the touch sensor without increasing the frame period (or interval), the pixel array can be driven in a shorter period than a normal period. As such, the timing controller 500 can set a write clock used for storing the block image data in the in-set signal controller 700 to have a higher frequency compared to a read clock used for reading-out the block image data from the in-set signal controller 700. Also, the timing controller 500 can set frequencies of the gate and data control signals GCS and DCS used for controlling the gate and data drivers 400 and 300 to become higher. To this end, the timing controller 500 can use a plurality of synchronous signals, which include another vertical synchronous signal Vsync, another horizontal synchronous signal, another data enable signal and another clock signal, having higher frequencies, compared to those applied from a host system.

For example, the timing controller 500 can control the data driver 300 and the gate driver 400 to be driven in one of higher frame frequencies, such as 100 Hz, 120 Hz, 180 Hz and so on, than the normal frame frequency of 60 Hz. Also, the timing controller 500 can apply at least one synchronous signal with a high frequency to the touch controller 600 and control the touch controller 600 to be driven in a high speed. Meanwhile, the in-set signal controller 700 can be included in the timing controller 500 or installed in such a manner as to be separate from the timing controller 500.

As described above, the plurality of gate lines GL1~GLn formed on the display panel 100 can be grouped into first through ith blocks. As such, the gate driver 400 responsive to the gate control signals and the mode control signal from the timing controller 50 can sequentially drive the first through ith blocks in a display mode interval every frame interval, and furthermore the gate lines within the respective block in a single line scanning interval (for example, a single horizontal synchronous interval) during each display mode interval. To this end, the gate driver 400 can be divided into a plurality of scan blocks which sequentially performs the scanning operation in a display mode interval by the mode control signal. Also, the gate driver 400 responsive to the mode control signal can control the gate lines GL1~GLn to be not driven in the touch sensing mode interval. Moreover, the gate driver 400 can apply not only a scan pulse with a gate enable voltage to each gate line GL in the respective line scanning interval (i.e., the respective horizontal synchronous interval) but also a gate disable voltage to each gate line GL during the rest period of the frame interval.

For example, the plurality of gate lines GL1~GLn can be grouped into two blocks. In other words, the plurality of gate lines GL1~GLn can be grouped into first and second blocks. The first and second blocks can be sequentially driven in a display mode interval every frame interval. Also, the plurality of gate lines GL1~GLn can be grouped into three blocks. In other words, the plurality of gate lines GL1~GLn can be grouped into first through third blocks. The first through third blocks can be sequentially driven in a display mode interval every frame interval.

The data driver 300 can reply to the data control signals and the mode control signal from the timing controller and apply the data voltages to the data lines DL1~DLm on the display panel 100 in each display mode interval. During the touch sensing mode intervals, the data driver 300 responsive to the mode control signal cannot drive the data lines DL1~DLm.

The data driver 300 can convert the digital image data from the timing controller 500 into positive/negative polarity analog data signals using gamma voltages. Also, the data driver 300 can apply the converted analog data voltages to the data lines DL1~DLm whenever one of the gate lines GL1~GLn is driven.

The touch screen LCD device according to an embodiment of the present disclosure can use common electrode 900 formed for displaying images as a touch electrode for sensing a touch of a user. In the display mode interval, images can be displayed by a common voltage Vcom which is applied to the common electrode 900. On the other hand, the touch of the user can be detected in the touch sensing mode interval corresponding to a non-display interval of a single frame interval or plural frame intervals when any image is not displayed. At this time, the data lines DL1~DLm can receive a ground voltage GND from the common voltage generator 1000.

Figure 5:
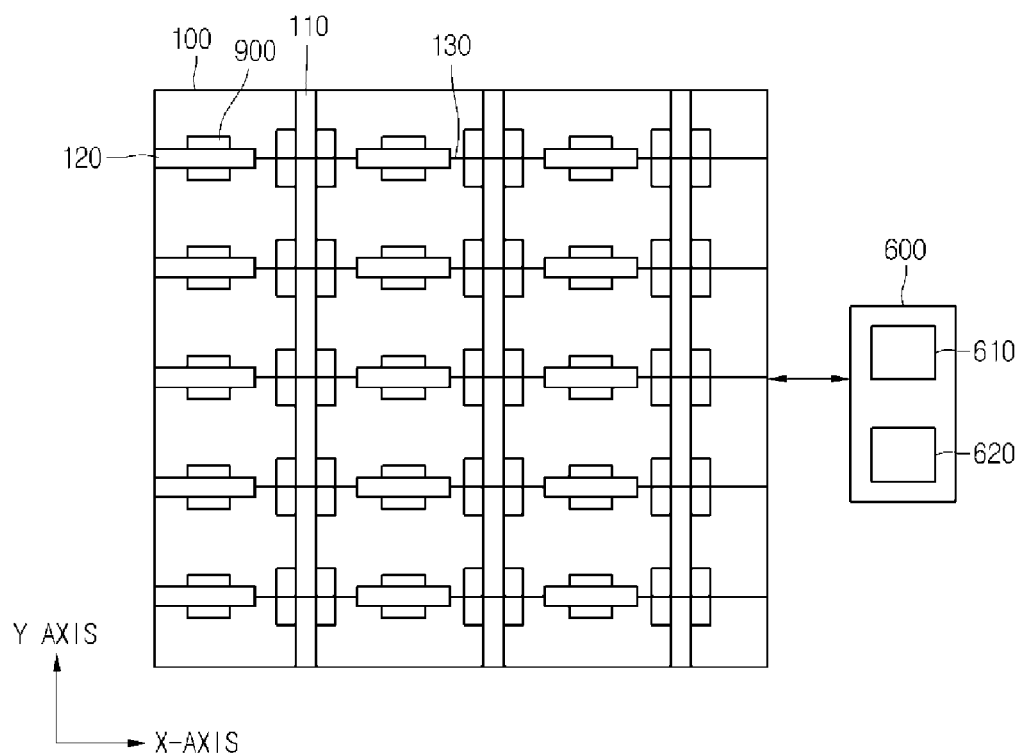
FIG. 5 is a planar view showing a common electrode of a touch screen panel according to an embodiment of the present disclosure.

FIG. 5 is a planar view showing a common electrode of a touch screen panel according to an embodiment of the present disclosure.

As shown in FIG. 5, the touch electrode can include a plurality of first lines 110 and a plurality of second lines 120 crossing each other, in order to sense touch coordinates of X and Y axes. Each of the first and second lines 110 and 120 can be driven either as a driving electrode receiving a touch driving signal for the detection of a touch, or as a receiving electrode sensing a variation of the capacitance which is caused by the touch of the user.

If the second line 120 is used as the driving electrode, the first line 110 can be driven as the receiving electrode. The receiving electrode role of the first line 110 and the driving electrode role of the second line 120 can be periodically exchanged with each other.

In order to detect the touch of the user, the touch screen display device of an in-cell capacitive type must sense X-axis and Y-axis coordinates. To this end, the first lines 110 arranged in the X-axis and the second lines 120 arranged in the Y-axis can be formed without contact with each other. The first and second lines 110 and 120 can be connected to the touch controller 600 through connection lines (not shown). The touch controller 600 can include a touch driver 610 and a touch receiving driver 620.

The touch receiving driver 620 can be connected to one part of the first lines 110 and the second lines 120 which is used as receiving electrodes, in order to sense a variation of the capacitance of the receiving electrode caused by the touch of the user. A touch position of the user can be detected through the comparison of the sensed capacitance and a reference capacitance. The detected touch position can be output to the exterior.

The touch controller 600 can be included into the timing controller 500. In this case, the timing controller 500 can control the touch sensing operation and receive the touch sensing signals.

The display device can allow the common electrodes 900 formed in the plurality of pixels to be separated from one another, in order to detect X-axis and Y-axis coordinates on the touch screen. Also, a part of the plurality of common electrodes 900 can be connected to one another in a first direction by the first lines 110, and the rest of common electrodes 900 can be connected to one another in a second direction perpendicular to the first direction by the second lines 120. In other words, the plurality of common electrodes 900 can form vertical touch sensing stripes and horizontal touch sensing stripes by the first lines 110 and the second lines 120.

Moreover, bridge lines 130 can further be formed on the lower substrate 100. The bridge lines 130 can separate the vertical touch sensing stripes from the horizontal touch sensing stripes. As such, the vertical touch sensing stripes and the horizontal touch sensing stripes cannot be connected to each other. The common electrodes forming the vertical and horizontal touch sensing stripes using the first and second lines 110 and 120 can be connected to the touch controller 600 through respective touch pad portions (not shown). In accordance therewith, the touch controller 600 can detect a touch position of a user.

The touch screen display device according to an embodiment of the present disclosure will now be described in detail.

The display panel 100 can include the plurality of pixels and the plurality of common electrodes 900. The gate driver 400 can group the plurality of gate lines GL1~GLm on the display panel 100 into first through ith blocks, and drive the grouped blocks in a first time interval. The numeral "i" can be an integer larger than "2". The first time interval can become a time period which is required to drive each of the first through ith blocks (i.e., a single block). The first time interval required to drive each block can be constantly set. In other words, the first and ith blocks can be driven in a first time interval during a single frame interval.

The data driver 300 can drive the plurality of data lines DL1~DLm on the display panel 100. More specifically, the data driver 300 can apply the data voltages to the data lines DL1~DLm when the gate driver 400 is driven.

The common voltage generator 1000 can apply the common voltage Vcom to the common electrodes 900. The operation of the common voltage generator 1000 can be controlled by the timing controller 500.

A touch sensing interval can be interposed between a time point after the gate lines GL1~GLx of the first block is driven and another time point before the gate lines GLx+1~GL2x is driven. In other words, during a second time interval between a time point after the gate lines within the ith block are driven and another time point before the gate lines within the (i-1)th block are driven, the touch controller 600 can detect a touch position on the display panel 100 using capacitances which are induced in the common electrodes 900.

The in-set signal controller 700 can store a line of digital image data opposite to pixels on the last gate line within one of the first through ith blocks. The digital image data stored in the in-set signal controller 700 can be used as an in-set signal. Also, the in-set signal controller 700 can supply the data lines DL1~DLm with the data voltages corresponding to the stored digital image data before the next block is driven. As such, the data voltages applied to the pixels on the last gate line of the previous block can be pre-charged in the data lines before the next block is driven. In accordance therewith, when a first gate line of the next block is driven, the data voltages being varied on the basis of the in-set voltages can be applied to the pixels on the first gate line of the next block through the data lines DL1~DLm.

For example, the in-set signal controller 700 stores a line of digital image data opposite to pixels on the last gate line of (i-1)th block when the (i-1)th block is driven. The digital image data stored in the in-set signal controller 700 can be applied to the data driver 300 and allow the data voltages to be applied to the data lines DL1~DLm as in-set signal voltages before the ith block is driven. As such, when a first gate line of the ith block is driven, the data voltages being varied on the basis of the in-set voltages can be applied to the pixels on the first gate line of the ith block through the data lines DL1~DLm.

The display device can further include a memory for storing the in-set signal. The memory can be built into the in-set signal controller 700.

In order to reset the in-set signal, which corresponds to the digital image data opposite to the pixels on the last gate line of the (i-1)th block, stored in the memory, the timing controller 500 can apply the reset signal to the in-set signal controller 700. As such, the in-set signal stored in the memory of the in-set signal controller 700 can be erased. Thereafter, the in-set signal controller 700 can store the digital image data opposite the pixels on the late gate line of the ith block.

Meanwhile, during the second time interval, the ground voltage GND can be applied from the common voltage generator 1000 to the data lines DL1~DLm.

Sequentially, a method of driving the gate lines which are grouped into first and second blocks will now be described.

The method of driving a touch screen display device according to an embodiment of the present disclosure will now be described with reference to FIGS. 6 and 7.

Figure 6:
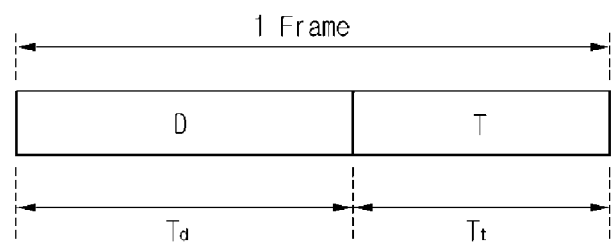
FIG. 6 is a timing chart illustrating a driving method of the touch screen display device according to an embodiment of the present disclosure.

As shown in FIG. 6, a single frame interval of about 16.7 ms can be divided into a single display interval Td and a single touch sensing interval Tt. As such, the display operation can be performed for the display panel 100 in the display interval Td and the touch sensing operation can be performed for the display panel 100 in the touch sensing interval Tt.

Figure 7:
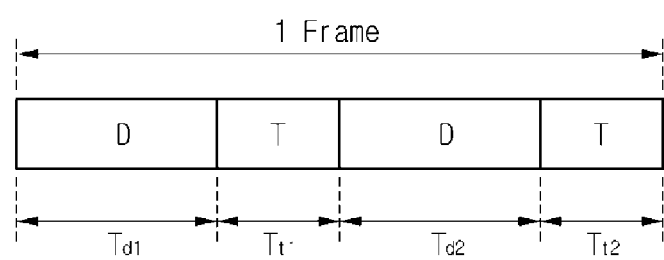
FIG. 7 is a timing chart illustrating another driving method of the touch screen display device according to an embodiment of the present disclosure.

Alternatively, if the frame frequency for driving the display panel 100 is increased from 60 Hz to 120 Hz and the gate lines on the display panel 100 are grouped into two blocks, a single frame interval can be divided into first and second display intervals Td1 and Td2 and first and second touch sensing intervals Tt1 and Tt2 as shown in FIG. 7. In this case, the display operation can be performed for the first block by sequentially driving the transistors on the gate lines within the first block line by line during the first display interval Td1. Also, the touch sensing operation can be performed for the display panel 100 in the first touch sensing interval Tt1. Subsequently, the display operation can be performed for the second block by sequentially driving the transistors on the gate lines within the second block line by line during the second display interval Td2. Thereafter, the touch sensing operation can be re-performed for the display panel 100 in the second touch sensing interval Tt2.

Similarly, the gate lines on the display panel 100 can be grouped into i blocks. In this case, not only i display operations opposite to the i blocks can be performed but also i touch sensing operations can be performed between the i display operations, during a single frame interval.

A method of driving a touch screen display device according to an embodiment of the present disclosure will now be described with reference to FIG. 8.

Figure 8:
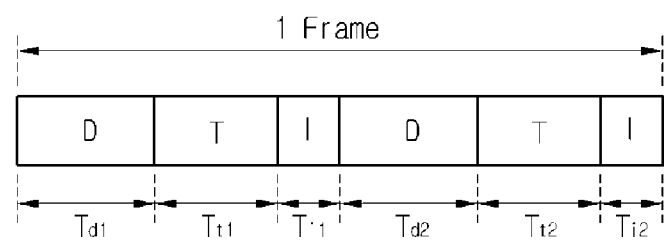
FIG. 8 is a timing chart illustrating still another driving method of the touch screen display device according to an embodiment of the present disclosure.

Referring to FIG. 8, the gate lines GL1~GLn on the display panel 100 can be grouped into two blocks, and a single frame interval can be divided into two display intervals Td1 and Td2, two touch sensing intervals Tt1 and Tt2 and two data inserting intervals Ti1 and Ti2. A first display operation can be performed for the first block in the first display interval Td1, and a second display operation can be performed for the second block in the second display interval Td2. A touch sensing operation and a data inserting operation can be sequentially performed for the display panel 100 between the first and second display intervals. The touch sensing operation is performed in the first touch sensing interval Tt1, and then the data inserting operation is performed in the first data inserting interval Ti1. Also, the touch sensing operation and the data inserting operation can be sequentially re-performed for the display panel 100 after the second block is driven. In other words, the second touch sensing operation is performed in the second touch sensing interval Tt2, and the second data inserting operation is performed in the second data inserting interval Ti2.

The data inserting operation allows inset signals corresponding to digital image data, which is opposite to the pixels on the gate line (one of the last gate lines of the first and second blocks) driven just before the touch sensing operation, to be applied to the data lines DL1~DLm. The data inserting interval Ti can be set to at least one clock signal period. Alternatively, the data inserting interval Ti can be larger than a period which is necessary to transfer a single data signal.

In this manner, the previous data voltage can be pre-charged in the data line DL just after the touch sensing interval Tt. As such, an undercharge phenomenon of the succeeding data signal in the succeeding display interval can be prevented.

The data just before the touch sensing operation can be stored into the in-set signal controller 700. The in-set signal controller 700 can store the data just before the touch sensing operation and allow data voltages corresponding to the stored data to be applied to the data lines DL1~DLm just after the touch sensing operation, under the control of the control signal applied from the timing controller 500. Also, the timing controller 500 can re-turn on the transistors on the gate line, which had been driven just before the touch sensing operation, by reapplying a gate signal to the gate line when the data voltages corresponding to the stored data are applied to the data lines DL1~DLm. Moreover, the in-set signal controller 700 can erase the stored data in response to the reset signal from the timing controller 500, and then store another data just before another touch sensing operation. In this way, the in-set signal controller 700 can repeatedly perform the data erasing and storing operations.

Inversion driving modes can be applied to the touch screen display device according to an embodiment of the present disclosure. In general, a liquid crystal material is polarized when a voltage is applied. If the polarized state of the liquid crystal material is maintained for a long time, the liquid crystal molecules can be immobilized. The immobilization of the liquid crystal material can not only cause a residual image but also deteriorate properties of the liquid crystal material. To address this matter, the inversion driving modes can be used in the touch screen display device.

The inversion driving modes can be classified into a frame inversion mode, a line inversion mode, a column inversion mode, a dot inversion mode and a two-dot inversion mode. The frame inversion mode inverts the polarity of entire frame data every frame. The line inversion mode inverts the polarity of pixel data every not only gate line but also frame. The column inversion mode inverts the polarity of pixel data every not only data line but also frame. The dot inversion mode inverts the polarity of pixel data every not only dot but also frame. The two dot inversion mode inverts the polarity of pixel data every not only two dots but also frame.

The reduction of consumption power is important to portable display devices. As such, in order to reduce consumption power, most display devices performing the display operation and the touch sensing operation in a gate line or a gate line block almost adopt the column inversion mode. In these cases, because data voltages applied to the data line are fixed to the same polarity, a current data voltage can be varied on the basis of the previous data voltage. However, the data line maintains the ground voltage GND during the touch sensing interval between the display intervals, and the data voltage is charged in the data line on the basis of the ground voltage GND after the touch sensing interval. Due to this, the above-mentioned undercharge phenomenon of the data voltage is caused by a large voltage difference between the data voltage and the ground voltage GND. To address this matter, the reduction of a charging voltage can be restrained by pre-charging the previous data voltage in the data line just after the touch sensing operation. As such, the line dim phenomenon can be prevented. This effect can be explained in detail with reference to FIG. 9.

Figure 9:
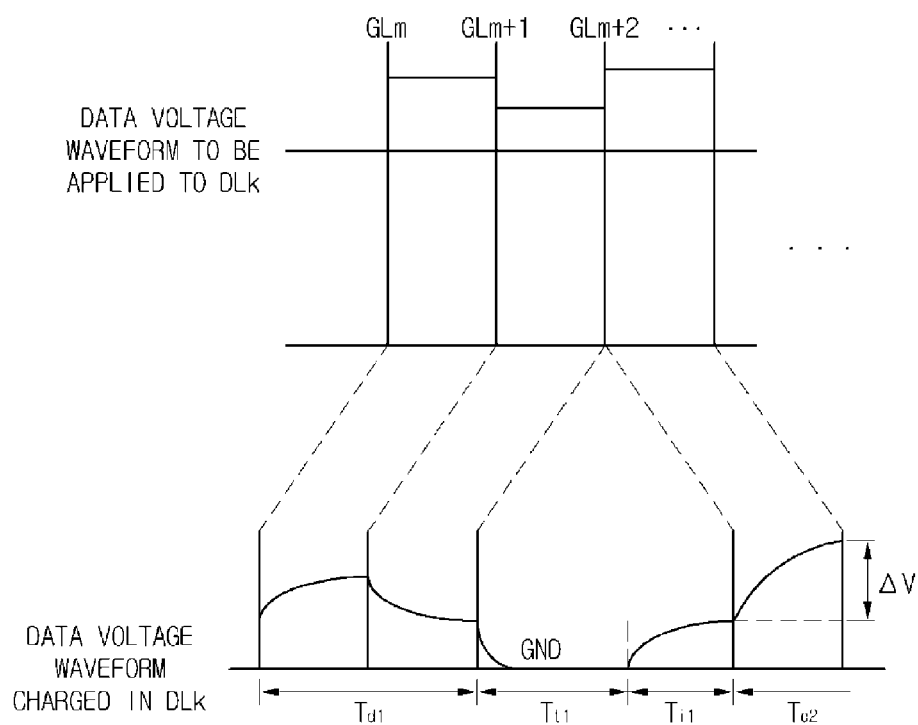
FIG. 9 is a waveform diagram illustrating an operation of the touch screen display device according to an embodiment of the present disclosure.

FIG. 9 is a waveform diagram illustrating an operation of the touch screen display device according to an embodiment of the present disclosure.

As shown in FIG. 9, pixels (hereinafter, mth and (m+1)th pixels) positioned at intersections of a kth data line DLk and mth and (m+1)th gate lines GLm and GLm+1 can be sequentially displayed in the first display interval Td1 (or a first primary time interval). More specifically, the mth pixel on an mth gate line GLm of the display panel 100 can be displayed by a mth data voltage being applied through the kth data line DLk and a transistor which is turned by a gate signal on the mth gate line GLm. Subsequently, the (m+1)th pixel on a (m+1)th gate line GLm+1 of the display panel 100 can be displayed by a (m+1)th data voltage being applied through the kth data line DLk and another transistor which is turned on by the gate signal on the (m+1)th gate line GLm+1. Also, during the first touch sensing interval Tt1 (or a first secondary time interval), the ground voltage Vcom is applied to the kth data line DLk, and then the touch of the user can be sensed through the common electrodes 900. Moreover, in the first data inserting interval Ti1 (or a first tertiary time interval) between the first touch sensing interval Tt1 and the second display interval Td2, the previous data voltage (i.e., the (m+1)th data voltage opposite to the pixel on the (m+1)th gate line) is pre-charged in the kth data line DLk. At this time, the previous data voltage can be re-charged into the pixel on the (m+1)th gate line DLm+1 by turning-on the transistor on the (m+)th gate line GLm+1. Thereafter, in the second display interval Td2, still another pixel (hereinafter, (m+2)th pixel) on the (m+2)th gate line GLm+2 of the display panel 100 can be firstly displayed by a (m+2)th data voltage being applied through the kth data line DLk and still another transistor which is turned-on by the gate signal on the (m+2)th gate line GLm+2. The (m+2)th data voltage on the kth data line DLk is varied on the basis of the previous data voltage (i.e., the (m+1)th data voltage). As such, when the (m+2)th pixel on the (m+2)th gate line GLm+2) is driven, the voltage variation in the kth data line DLk can be reduced into a voltage difference V between the (m+2)th data voltage and the previous data voltage (i.e., the (m+1)th data voltage. In accordance therewith, a picture fault (or an image fault) such as a line dim phenomenon due to the undercharge of the data voltage can be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:

1. A touch screen display device comprising:
a display panel configured to include a plurality of pixels and a plurality of common electrodes;
a gate driver configured to group a plurality of gate lines on the display panel into at least two blocks and sequentially drive the at least two blocks in a first display time interval and a second display time interval;
a data driver configured to drive a plurality of data lines on the display panel during the first display time interval and the second display time interval;
a common voltage generator configured to apply a common voltage to the common electrodes during the first display time interval and the second display time interval;
a touch controller configured to detect a touch position on the display panel using a capacitance being induced in the common electrodes during a touch sensing time interval from a time point after a respective block is driven in the first display time interval to another time point before a succeeding block is driven in the second display time interval; and
an in-set signal controller configured to store, in a memory, in-set signals corresponding to data signals provided to the pixels on a last gate line within the respective block, the in-set signals stored prior to the touch sensing interval and during the first display time interval when the respective block is driven, the in-set signals supplied from the memory to the data lines after the touch sensing time interval and before the second display time interval during which the succeeding block is driven,
wherein the data lines are driven with a non-data voltage during the touch sensing time interval.

2. The touch screen display device of claim 1, wherein the gate driver re-drives the last gate line within the respective block whenever the in-set signals are applied to the data lines.

3. The touch screen display device of claim 1, further comprising a timing controller configured to control the gate driver, the data driver, the common voltage generator, the touch controller and the in-set signal controller in operational timing.

4. The touch screen display device of claim 3, wherein the timing controller applies a reset signal for resetting the in-set signals stored in the memory when the succeeding block is driven.

5. A method of driving a touch screen display device, the method comprising:
sequentially driving at least two blocks, into which a plurality of gate lines on a display panel are grouped, in a first display time interval and a second display time interval using a gate driver;
repeatedly applying data signals to a plurality of data lines on the display panel during the first display time interval and the second display time interval using a data driver;
storing, in a memory, the data signals corresponding to pixels on a last gate line within a respective block as in-set signals during the first display time interval;
sensing a touch position on the display panel during a touch sensing time interval between the first display time interval where the respective block is driven and the second display time interval where a succeeding block is driven;
driving the data lines with a non-data voltage during the touch sensing time interval; and
supplying the in-set signals from the memory to the data lines during an inserting interval after the touch sensing time interval and before the succeeding block is driven in the second display time interval.

6. The method of claim 5, further comprising re-driving the last gate line within the respective block using the gate driver whenever the in-set signals are applied to the data lines.

7. The method of claim 5, wherein the at least two blocks are sequentially driven during a single frame.

8. The method of claim 5, wherein the display panel is driven in a column inversion mode allowing the data signals to be inverted alternately with one another in polarity according to the data lines.

9. The method of claim 5, further comprising resetting the memory when the succeeding block is driven.

10. A driving circuit for a display panel that comprises a plurality of pixels and a plurality of common electrodes, the driving circuit comprising:
a gate driver configured to group a plurality of gate lines on the display panel into at least two blocks and sequentially drive the at least two blocks in a first display time interval and a second display time interval;
a data driver configured to drive a plurality of data lines on the display panel during the first display time interval and the second display time interval;
a common voltage generator configured to apply a common voltage to the common electrodes during the first display time interval and the second display time interval;
a touch controller configured to detect a touch position on the display panel using a capacitance being induced in the common electrodes during a touch sensing time interval from a time point after a respective block is driven in the first display time interval to another time point before a succeeding block is driven in the second display time interval; and
an in-set signal controller configured to store, in a memory, in-set signals corresponding to data signals provided to the pixels on a last gate line within the respective block, the in-set signals stored prior to the touch sensing interval and during the first display time interval when the respective block is driven, the in-set signals supplied from the memory to the data lines after the touch sensing time interval and before the second display time interval during which the succeeding block is driven,
wherein the data lines are driven with a non-data voltage during the touch sensing time interval.

11. The driving circuit of claim 10, wherein the gate driver re-drives the last gate line within the respective block whenever the stored in-set signals are applied to the data lines.

12. The driving circuit of claim 10, further comprising a timing controller configured to control the gate driver, the data driver, the common voltage generator, the touch controller and the in-set signal controller in operational timing.

13. The driving circuit of claim 12, wherein the timing controller applies a reset signal for resetting the in-set signals stored in the memory when the succeeding block is driven.

* * * * *